United States Patent
Hong

(10) Patent No.: US 11,968,716 B2
(45) Date of Patent: Apr. 23, 2024

(54) INFORMATION CONFIGURATION METHODS, AND INFORMATION REPORTING METHODS, BASE STATION, AND USER EQUIPMENT

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 359 days.

(21) Appl. No.: 17/628,891

(22) PCT Filed: Jul. 23, 2019

(86) PCT No.: PCT/CN2019/097346
§ 371 (c)(1),
(2) Date: Jan. 20, 2022

(87) PCT Pub. No.: WO2021/012193
PCT Pub. Date: Jan. 28, 2021

(65) Prior Publication Data
US 2022/0256602 A1    Aug. 11, 2022

(51) Int. Cl.
*H04W 74/0816* (2024.01)
*H04W 72/0453* (2023.01)
*H04W 74/08* (2009.01)

(52) U.S. Cl.
CPC ... *H04W 74/0816* (2013.01); *H04W 72/0453* (2013.01); *H04W 74/0866* (2013.01)

(58) Field of Classification Search
CPC ......... H04W 72/0453; H04W 74/0808; H04W 74/0866; H04W 74/0816
See application file for complete search history.

(56) References Cited

U.S. PATENT DOCUMENTS

| 11,924,877 | * | 3/2024 | Kim | H04W 74/0816 |
| 2018/0331801 | A1* | 11/2018 | Islam | H04L 5/0048 |
| 2018/0332617 | A1* | 11/2018 | Zeng | H04W 72/0453 |
| 2019/0069198 | A1* | 2/2019 | Gheorghiu | H04L 5/001 |
| 2020/0154399 | A1* | 5/2020 | Zhu | H04W 72/02 |

(Continued)

FOREIGN PATENT DOCUMENTS

| CN | 104581908 A | 4/2015 |
| CN | 109417800 A | 3/2019 |

(Continued)

OTHER PUBLICATIONS

Vivo, R1-1808240, "Discussion on the enhancements to configured grants," 3GPP TSG RAN WG1 Meeting #94 (2018).

(Continued)

*Primary Examiner* — Syed Ali
(74) *Attorney, Agent, or Firm* — Volpe Koenig

(57) ABSTRACT

An information configuration method including: transmitting an information reporting request to a terminal working in an unlicensed frequency band, wherein the information reporting request is used for requesting the terminal to report listen before talk (LBT) information: receiving the LBT information that is reported by the terminal according to the information reporting request; and performing parameter configuration on the terminal according to the LBT information.

3 Claims, 6 Drawing Sheets

(56) References Cited

U.S. PATENT DOCUMENTS

| | | | |
|---|---|---|---|
| 2020/0229022 A1* | 7/2020 | Vargantwar | H04B 17/318 |
| 2021/0007101 A1* | 1/2021 | Tooher | H04W 72/0446 |
| 2021/0068154 A1* | 3/2021 | Jia | H04W 74/008 |
| 2021/0144743 A1* | 5/2021 | Rastegardoost | H04W 72/23 |
| 2021/0243808 A1* | 8/2021 | Deenoo | H04L 5/005 |
| 2021/0345405 A1* | 11/2021 | Kim | H04W 24/10 |
| 2021/0378007 A1* | 12/2021 | You | H04W 76/28 |
| 2021/0410186 A1* | 12/2021 | Hajir | H04W 74/0816 |
| 2022/0240314 A1* | 7/2022 | Zhu | H04L 5/0098 |

FOREIGN PATENT DOCUMENTS

| | | |
|---|---|---|
| CN | 109863777 A | 6/2019 |
| WO | 2018/176634 A1 | 10/2018 |

OTHER PUBLICATIONS

Vivo. "Discussion on the enhancements to configured grants" 3GPP TSG RAN WG1 Meeting#94bis, R1-1810385, 2018年10月12日 (Oct. 12, 2018).

\* cited by examiner

INFORMATION CONFIGURATION METHODS, AND INFORMATION REPORTING METHODS, BASE STATION, AND USER EQUIPMENT

CROSS-REFERENCE TO RELATED APPLICATION

The present application is a U.S. National Phase of International Patent Application Serial No. PCT/CN2019/097346 filed on Jul. 23, 2019. The entire contents of the above-cited application are hereby incorporated by reference in their entirety for all purposes.

BACKGROUND

With the rapid development of wireless communication technology, the 5th Generation (5G) mobile communication technology has emerged. In order to extend the 5G New Radio (NR) technology to unlicensed frequency bands, the 3rd Generation Partnership Project (3GPP) passed the 5G research project, which enables the NR to meet the regulatory requirements of unlicensed frequency bands and can ensure the compatibility with other access technologies working on the unlicensed frequency bands.

The listen before talk (LBT) mechanism is required by many national laws and regulations. If an NR terminal desires to work normally on an unlicensed frequency band, it needs to follow the LBT mechanism. The NR (NR-U) terminal and base station working on an unlicensed frequency band are different from ordinary NR terminals and base stations, and require an additional LBT function to support transmission on the unlicensed frequency band.

SUMMARY

In view of this, the present application provides an information configuration method, an information reporting method, a base station, a user equipment, and a computer-readable storage medium, to reduce the probability of LBT failure and improve the overall performance of the system.

According to a first aspect of the examples of the disclosure, an information configuration method is provided and applied to a base station, the method including:
  sending an information reporting request to a terminal working on an unlicensed frequency band, the information reporting request being used to request the terminal to report listen before talk (LBT) information;
  receiving the LBT information reported by the terminal according to the information reporting request; and
  performing parameter configuration on the terminal according to the LBT information.

According to a second aspect of the examples of the disclosure, an information reporting method is provided, applied to a terminal working on an unlicensed frequency band, the method including:
  receiving an information reporting request sent by a base station, the information reporting request being used to request the terminal to report listen before talk (LBT) information; and
  reporting the LBT information to the base station according to the information reporting request.

According to a third aspect of the examples of the disclosure, a base station is provided, including:
  a processor; and
  a memory for storing processor executable instructions, whereby the processor is configured to:

send an information reporting request to a terminal working on an unlicensed frequency band, the information reporting request being used to request the terminal to report listen before talk (LBT) information;
  receive the LBT information reported by the terminal according to the information reporting request; and
  perform parameter configuration on the terminal according to the LBT information.

According to a fourth aspect of the examples of the disclosure, a user equipment is provided, including:
  a processor; and
  a memory for storing processor executable instructions, whereby the processor is configured to perform the information reporting method as described in the second aspect of the disclosure.

According to a fifth aspect of the examples of the disclosure, a non-transitory computer-readable storage medium is provided, storing computer instructions thereon, and when the instructions are executed by a processor, the steps of the information configuration method described above are implemented.

According to a sixth aspect of the examples of the disclosure, a non-transitory computer-readable storage medium is provided, storing computer instructions thereon, and when the instructions are executed by a processor, the steps of the information reporting method described above are implemented.

It should be understood that the above general description and the following detailed description are only exemplary and explanatory, and are not intended to limit the disclosure.

BRIEF DESCRIPTION OF THE DRAWINGS

The accompanying drawings herein are incorporated into the specification and constitute a part of the specification, they show examples consistent with the disclosure, and are used to explain the principles of the disclosure together with the specification.

DETAILED DESCRIPTION OF THE EXAMPLES

Examples will be described in detail here, and examples are shown in the accompanying drawings. When the following descriptions refer to the drawings, the same numbers in different drawings indicate the same or similar elements, unless otherwise indicated. The implementation manners described in the following examples do not represent all implementation manners consistent with the disclosure. Instead, they are merely examples of apparatuses and methods consistent with some aspects of the disclosure as detailed in the appended claims.

As described in the background, a NR (NR-U) terminal and base station working on an unlicensed frequency band are different from ordinary NR terminals and base stations, and they require an additional LBT function to support transmission on the unlicensed frequency band. The LBT mechanism also determines that the NR-U terminal needs to compete for access and succeed in the competition before transmitting data and signaling, reducing transmission opportunities compared with terminals working on licensed frequency bands. Moreover, the unlicensed frequency bands are shared frequency bands. As long as the communication technologies meet the regulatory requirements, they can work on the unlicensed frequency bands. The interference on the unlicensed frequency bands will be greater than that on the licensed frequency bands. Especially in areas where many users use unlicensed frequency bands, the probability that NR-U terminals fail in LBT will increase. The excessively high probability of LBT failure can cause performance degradation of the NR-U system, for example, random access and data transmission cannot be performed due to performance degradation, and performance degradation may increase the power consumption of the NR-U terminal.

In order to solve the above technical problems, the disclosure provides an information configuration method, an information reporting method, a base station, a user equipment, and a computer-readable storage medium.

Figure 1:
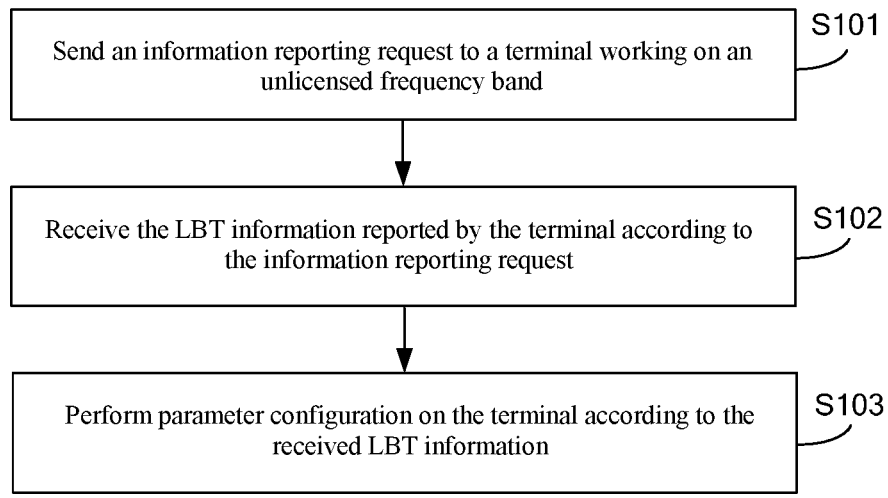
FIG. 1 is a flowchart of an information configuration method shown in an example of the present application.

FIG. 1 is a flowchart of an information configuration method shown in an example of the present application. This example is described from the perspective of a base station. As shown in FIG. 1, the information configuration method includes:

In step S101, an information reporting request is sent to a terminal working on an unlicensed frequency band, the information reporting request being used to request the terminal to report LBT information.

In this example, the LBT information may include LBT results and location information of LBT, may also include location information when the LBT fails, and may further include location information where the number of LBT failures is greater than a preset number.

The preset number can be set according to requirements. The LBT results include LBT failure or LBT success. The terminal working on the unlicensed frequency band is an NR-U terminal.

In step S102, the LBT information reported by the terminal according to the information reporting request is received.

In step S103, parameter configuration is performed on the terminal according to the received LBT information.

The parameter configuration on the terminal according to the LBT information may include, but is not limited to: determining, according to the LBT information, a target area with an LBT failure probability greater than a preset probability, and increasing the random access response (RAR) waiting window duration of the target area.

The preset probability can be flexibly set according to requirements.

In the above example, by receiving the LBT information reported by the terminal according to the information reporting request, and performing parameter configuration on the terminal according to the LBT information, the probability of LBT failure is reduced and the overall performance of the system is improved.

Figure 2:
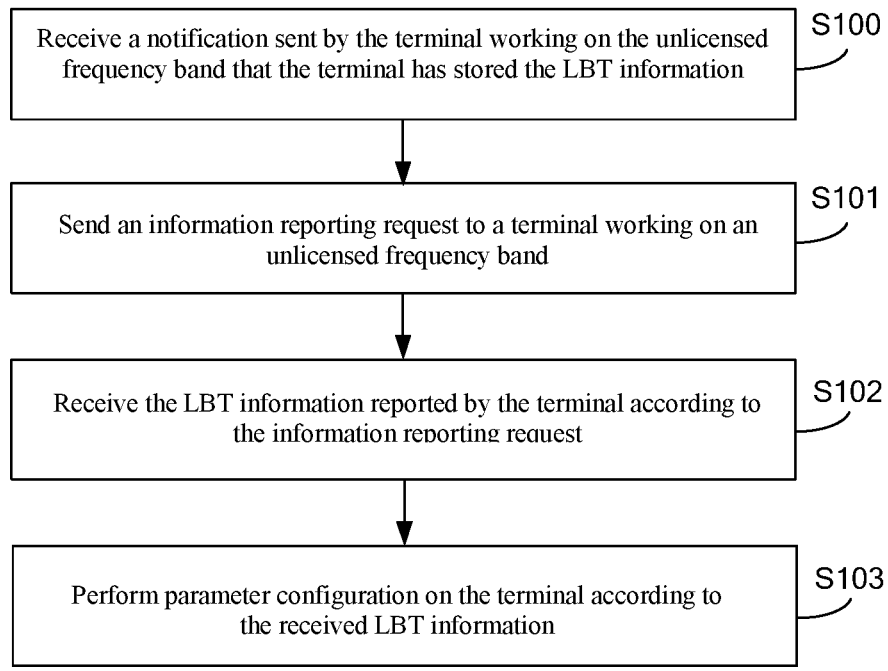
FIG. 2 is a flowchart of another information configuration method shown in an example of the present application.

FIG. 2 is a flowchart of another information configuration method shown in an example of the present application. As shown in FIG. 2, before step S101 as described above, the information configuration method may further include:

In step S100, a notification sent by the terminal working on the unlicensed frequency band that the terminal has stored the LBT information is received.

In this example, each time the terminal performs LBT, the terminal can record and save LBT information, and send to the base station a notification that the terminal has stored the LBT information when connected to the base station.

In the foregoing example, the notification sent by the terminal working on the unlicensed frequency band that the terminal has stored the LBT information is received, which provides conditions for the base station to obtain the LBT information of the terminal and perform parameter configuration on the terminal based on the LBT information subsequently.

Figure 3:
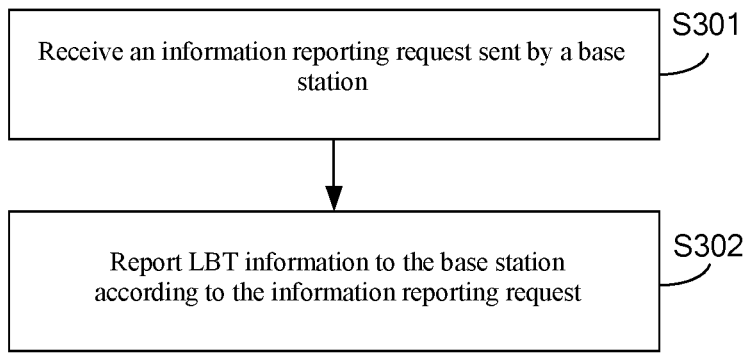
FIG. 3 is a flowchart of an information reporting method shown in an example of the present application.

FIG. 3 is a flowchart of an information reporting method shown in an example of the present application. This example is described from the perspective of a terminal working on an unlicensed frequency band. As shown in FIG. 3, the method includes:

In step S301, an information reporting request sent by a base station is received, the information reporting request being used to request the terminal to report LBT information.

In this example, the LBT information may include LBT results and location information of LBT, may also include location information when the LBT fails, and may further include location information where the number of LBT failures is greater than a preset number.

The preset number can be set according to requirements.

In step S302, the LBT information is reported to the base station according to the information reporting request.

In the above example, by receiving the information reporting request sent by the base station, and reporting the LBT information to the base station according to the information reporting request, the base station can perform parameter configuration on the terminal according to the LBT information, so as to reduce the probability of LBT failure, improve the overall performance of the system and reduce the power consumption of the terminal.

Figure 4:
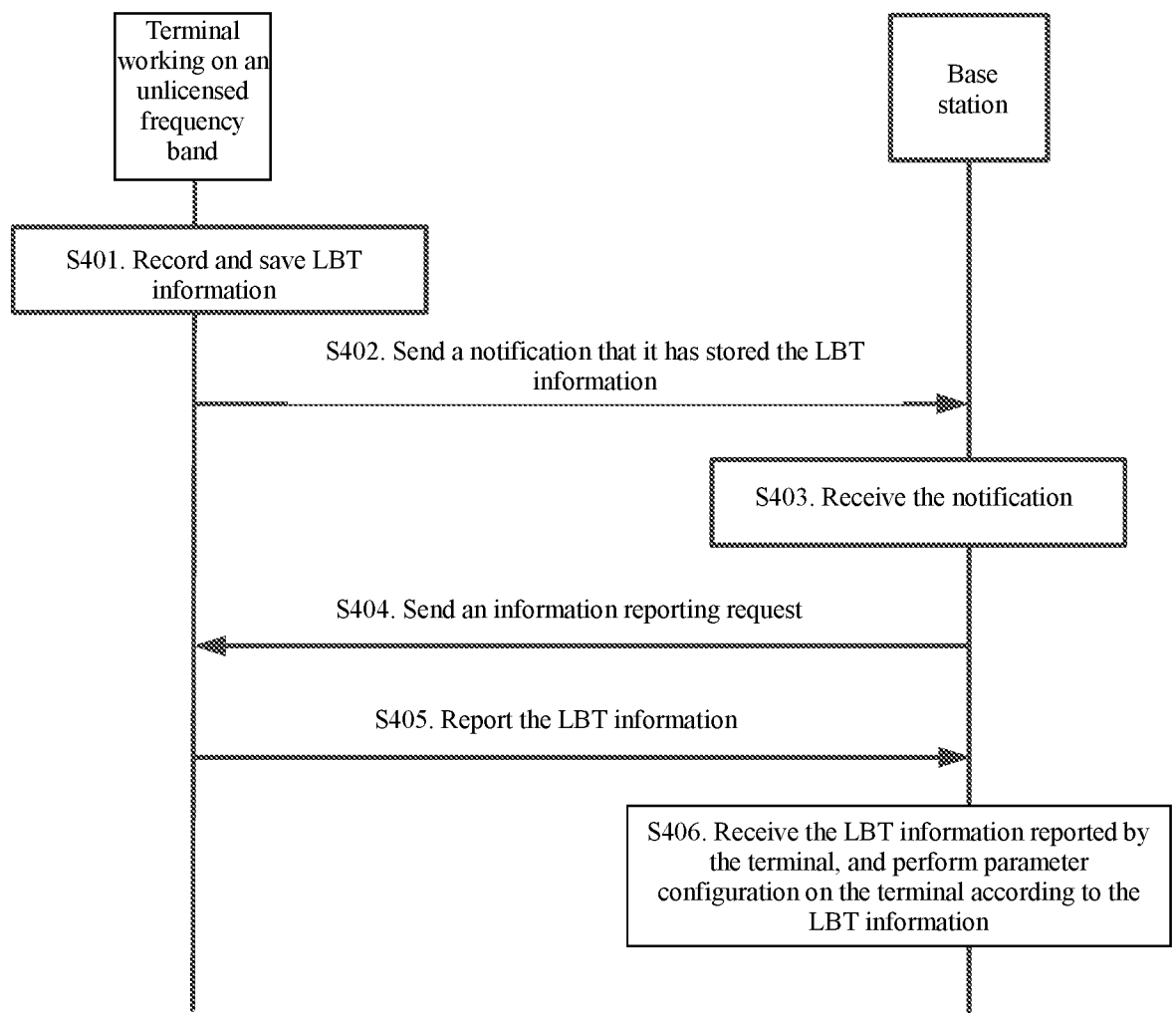
FIG. 4 is a signaling flowchart of an information configuration method shown in an example of the present application.

FIG. 4 is a signaling flowchart of an information configuration method shown in an example of the present application. This example is described from the perspective of interaction between a base station and a terminal working on an unlicensed frequency band. As shown in FIG. 4, the method includes:

In step S401, the terminal records and saves LBT information when performing LBT.

The terminal may record and save a result of LBT and location information of LBT each time it performs LBT, it may also only record location information when the LBT fails, or it may only record location information where the number of LBT failures exceeds a preset number.

In step S402, when connected to the base station, the terminal sends to the base station a notification that it has stored the LBT information.

In step S403, the base station receives the notification.

In step S404, the base station sends an information reporting request to the terminal, the information reporting request being used to request the terminal to report LBT information.

When the base station desires to obtain the LBT information of the terminal, it can send the information reporting request to the terminal.

In step S405, the terminal receives the information reporting request sent by the base station, and reports the LBT information to the base station according to the information reporting request.

In step S406, the base station receives the LBT information reported by the terminal, and performs parameter configuration on the terminal according to the LBT information.

In the above example, through the interaction between the base station and the terminal working on the unlicensed frequency band, the base station can receive the LBT information reported by the terminal according to the information reporting request, and perform parameter configuration on the terminal according to the LBT information, so as to reduce the probability of LBT failure and improve the overall performance of the system.

Figure 5:
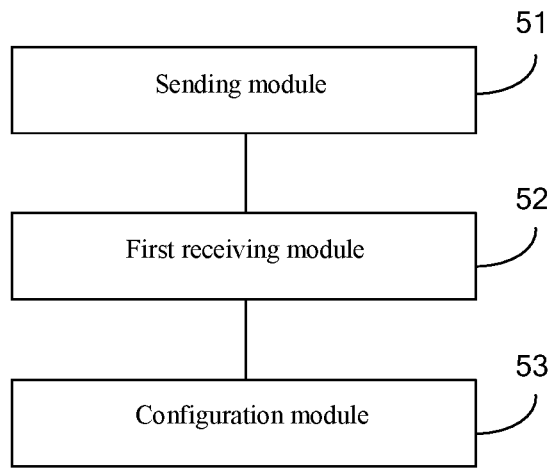
FIG. 5 is a block diagram showing an information configuration apparatus according to an example of the present application.

FIG. 5 is a block diagram showing an information configuration apparatus according to an example. The apparatus may be located in a base station. As shown in FIG. 5, the apparatus includes:

The sending module 51 is configured to send an information reporting request to a terminal working on an unlicensed frequency band, the information reporting request being used to request the terminal to report listen before talk (LBT) information.

In this example, the LBT information may include LBT results and location information of LBT, may also include location information when the LBT fails, and may further include location information where the number of LBT failures is greater than a preset number.

The preset number can be set according to requirements. The LBT results include LBT failure or LBT success. The terminal working on the unlicensed frequency band is an NR-U terminal.

The first receiving module 52 is configured to receive the LBT information reported by the terminal according to the information reporting request sent by the sending module 51.

The configuration module 53 is configured to perform parameter configuration on the terminal according to the LBT information received by the first receiving module 52.

The parameter configuration on the terminal according to the LBT information may include, but is not limited to: determining, according to the LBT information, a target area with an LBT failure probability greater than a preset probability, and increasing the random access response (RAR) waiting window duration of the target area.

The preset probability can be flexibly set according to requirements.

In the above example, by receiving the LBT information reported by the terminal according to the information reporting request, and performing parameter configuration on the terminal according to the LBT information, the probability of LBT failure is reduced and the overall performance of the system is improved.

Figure 6:
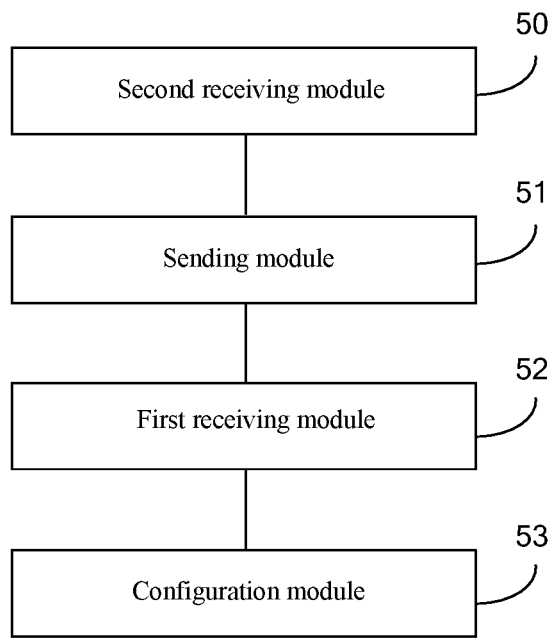
FIG. 6 is a block diagram showing another information configuration apparatus according to an example of the present application.

FIG. 6 is a block diagram showing another information configuration apparatus according to an example. As shown in FIG. 6, on the basis of the example shown in FIG. 5, the apparatus may further include:

A second receiving module 50, configured to, before the sending module 51 sends the information reporting request to the terminal working on the unlicensed frequency band, receive a notification sent by the terminal that the terminal has stored the LBT information.

In this example, each time the terminal performs LBT, the terminal can record and save LBT information, and send to the base station a notification that the terminal has stored the LBT information when the terminal is connected to the base station.

In the foregoing example, the notification sent by the terminal working on the unlicensed frequency band that the terminal has stored the LBT information is received, which provides conditions for the base station to obtain the LBT information of the terminal and perform parameter configuration on the terminal based on the LBT information subsequently.

Figure 7:
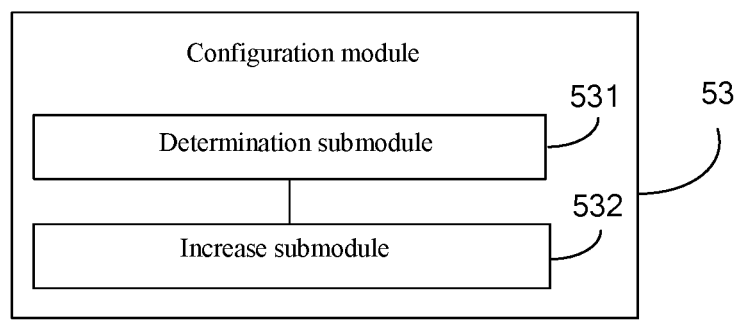
FIG. 7 is a block diagram showing another information configuration apparatus according to an example of the present application.

FIG. 7 is a block diagram showing another information configuration apparatus according to an example. As shown in FIG. 7, on the basis of the example shown in FIG. 5, the configuration module 53 may include:

a determination submodule 531, configured to determine, according to the LBT information, a target area with an LBT failure probability greater than a preset probability; and an increase submodule 532, configured to increase the random access response (RAR) waiting window duration of the target area determined by the determination submodule 531.

In the above example, the probability of LBT failure is reduced by determining the target area with an LBT failure probability greater than a preset probability, and increasing the RAR waiting window duration of the target area determined.

Figure 8:
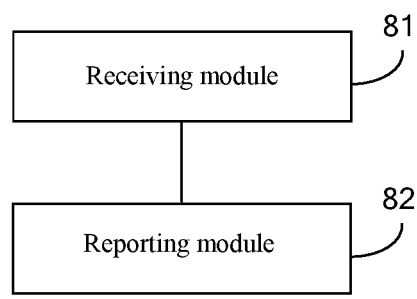
FIG. 8 is a block diagram showing an information reporting apparatus according to an example of the present application.

FIG. 8 is a block diagram showing an information reporting apparatus according to an example. The apparatus is located in a terminal working on an unlicensed frequency band. As shown in FIG. 8, the apparatus includes:

The receiving module 81 is configured to receive an information reporting request sent by a base station, the information reporting request being used to request the terminal to report listen before talk (LBT) information.

In this example, the LBT information may include LBT results and location information of LBT, may also include location information when the LBT fails, and may further include location information where the number of LBT failures is greater than a preset number.

The preset number can be set according to requirements.

The reporting module 82 is configured to report the LBT information to the base station according to the information reporting request received by the receiving module 81.

In the above example, by receiving the information reporting request sent by the base station, and reporting the LBT information to the base station according to the information reporting request, the base station can perform parameter configuration on the terminal according to the LBT information, so as to reduce the probability of LBT failure, improve the overall performance of the system and reduce the power consumption of the terminal.

Figure 9:
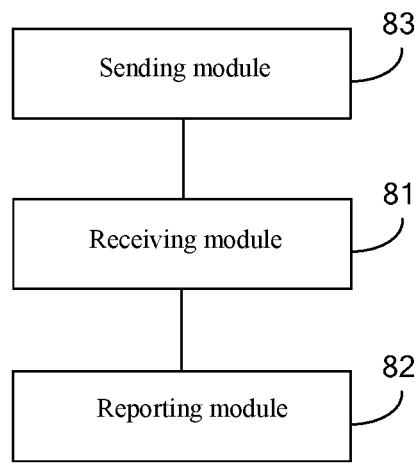
FIG. 9 is a block diagram showing another information configuration apparatus according to an example of the present application.

FIG. 9 is a block diagram showing another information reporting apparatus according to an example. As shown in FIG. 9, on the basis of the example shown in FIG. 8, the apparatus may further include:

The sending module 83 is configured to, before the receiving module 81 receives the information reporting request sent by the base station, when connected to the base station, send to the base station a notification that the terminal has stored the LBT information.

In the above example, the notification that the terminal has stored the LBT information is sent to the base station, so that the base station obtains the LBT information according to the notification.

Figure 10:
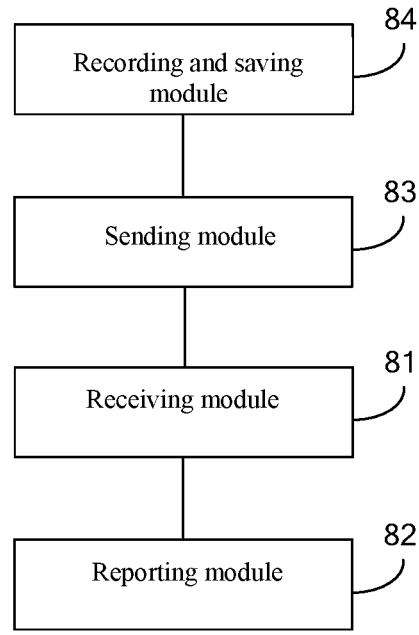
FIG. 10 is a block diagram showing another information configuration apparatus according to an example of the present application.

FIG. 10 is a block diagram showing another information reporting apparatus according to an example. As shown in FIG. 10, on the basis of the example shown in FIG. 9, the apparatus may further include:

The recording and saving module 84 is configured to record and save the LBT information when performing LBT before the sending module 83 sends to the base station the notification that the terminal has stored the LBT information.

In the above example, by recording and saving the LBT information, the notification that the terminal has stored the LBT information is sent to the base station when connected to the base station.

Figure 11:
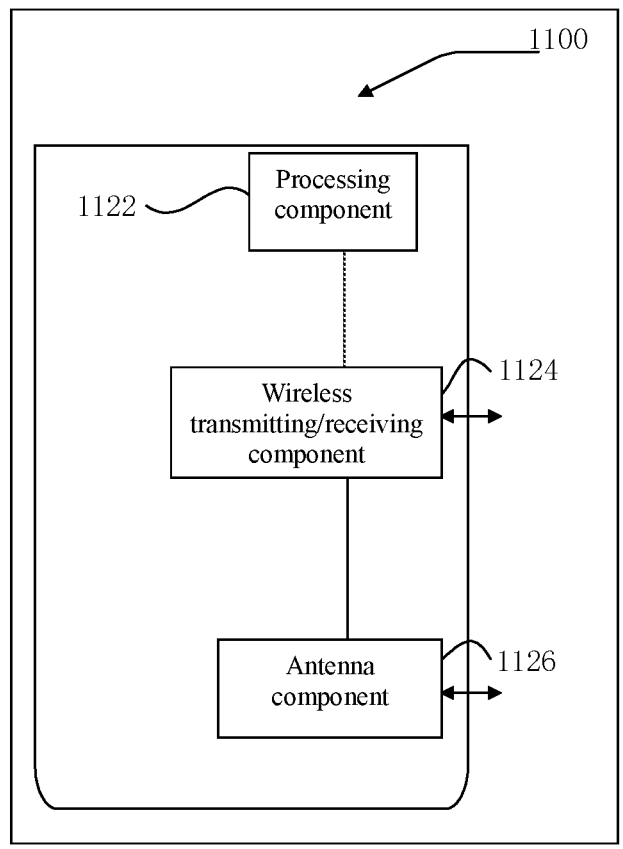
FIG. 11 is a block diagram showing an apparatus suitable for information configuration according to an example of the present application.

FIG. 11 is a block diagram showing another apparatus suitable for information configuration according to an example. The apparatus 1100 may be provided as a base station. Referring to FIG. 11, the apparatus 1100 includes a processing component 1122, a wireless transmitting/receiving component 1124, an antenna component 1126, and a signal processing part specific to a wireless interface. The processing component 1122 may further include one or more processors.

One or more of the processors in the processing components 1122 may be configured to:
    send an information reporting request to a terminal working on an unlicensed frequency band, the information reporting request being used to request the terminal to report listen before talk (LBT) information;
    receive the LBT information reported by the terminal according to the information reporting request; and
    perform parameter configuration on the terminal according to the LBT information.

In an example, a non-transitory computer-readable storage medium including processor-executable instructions is further provided. The processor-executable instructions can be executed by the processing component 1122 of the apparatus 1100 to carry out the foregoing information configuration method. For example, the non-transitory computer-readable storage medium may be an ROM, a random access memory (RAM), a CD-ROM, a magnetic tape, a floppy disk, an optical data storage device, etc.

Figure 12:
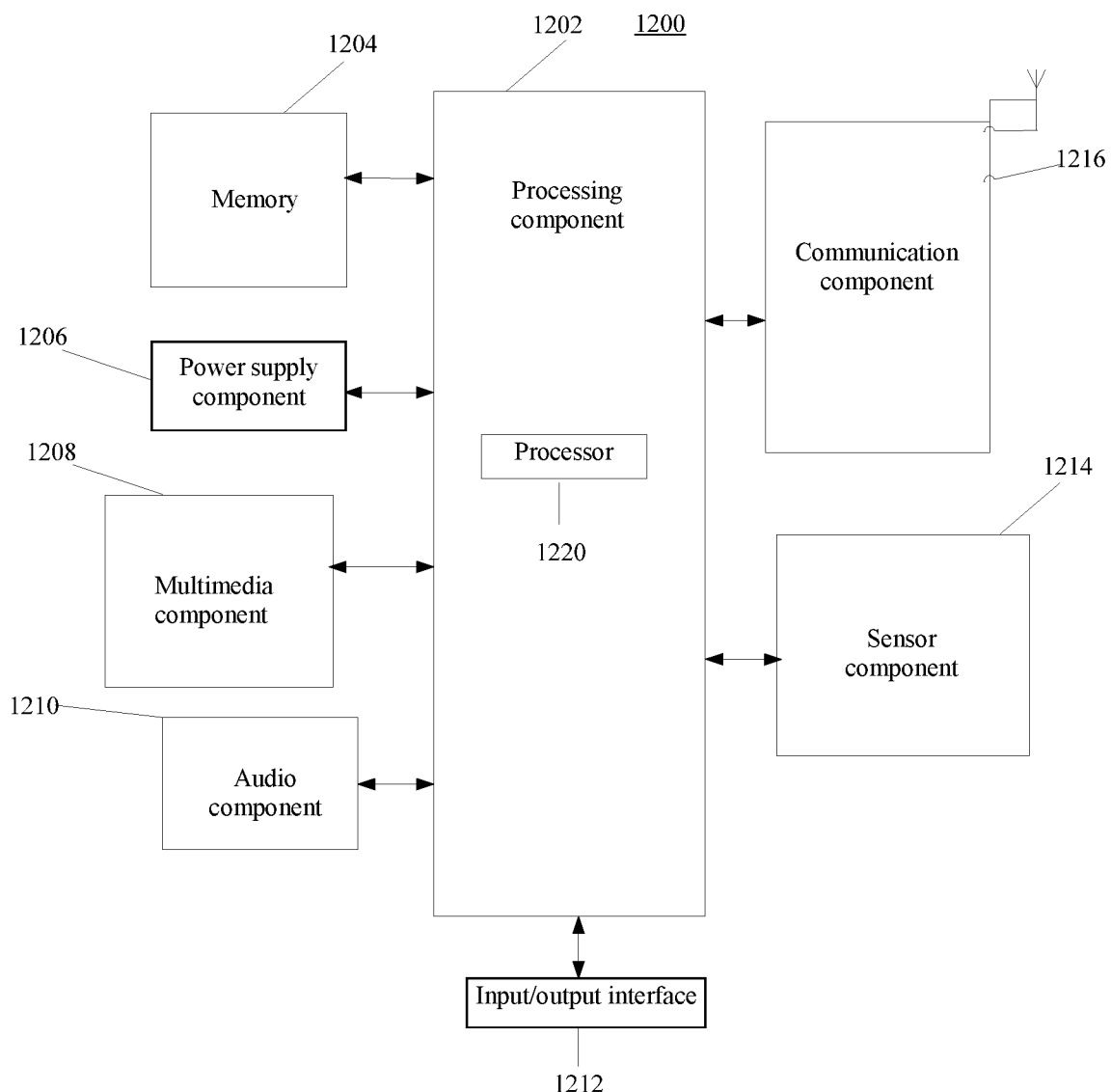
FIG. 12 is a block diagram showing an apparatus suitable for information reporting according to an example of the present application.

FIG. 12 is a block diagram showing an apparatus suitable for information configuration according to an example. For example, the apparatus 1200 may be user equipment such as a cell phone, a computer, a digital broadcasting terminal, a messaging device, a game console, a tablet device, a medical device, a fitness device, or a personal digital assistant.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 usually controls the overall operations of the apparatus 1200, such as operations associated with display, telephone call, data communication, camera operation and recording operation. The processing component 1202 may include one or more processors 1220 to execute instructions to complete all of or part of the steps of the above method. In addition, the processing component 1202 may include one or more modules to facilitate the interaction between the processing component 1202 and other components. For example, the processing component 1202 may include a multimedia module to facilitate interaction between the multimedia component 1208 and the processing component 1202.

One of the processors 1220 in the processing component 1202 may be configured to:
    receive an information reporting request sent by a base station, the information reporting request being used to request the terminal to report listen before talk (LBT) information; and
    report the LBT information to the base station according to the information reporting request.

The memory 1204 is configured to store various types of instructions and data to support operations at the apparatus 1200. Examples of these include instructions for any application or method operated on the apparatus 1200, contact data, phone book data, messages, pictures, videos, etc. The memory 1204 may be implemented by any type of volatile or non-volatile storage device or a combination, such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk or an optical disk.

The power component 1206 provides power for various components of the device 1200. The power component 1206 may include a power management system, one or more power sources, and other components associated with power generation, management and distribution of the apparatus 1200.

The multimedia component 1208 includes a screen for providing an output interface between the device 1200 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of a touch or slide, but also the duration and pressure associated with the touch or slide. In some examples, the multimedia component 1208 includes a front camera and/or a rear camera. When the apparatus 1200 is in an operation mode, such as a shooting mode or a video mode, the front camera and/or the rear camera can receive external multimedia data. Each front or rear camera may be a fixed optical lens system or have focal length and optical zoom capability.

The audio component 1210 is configured to output and/or input audio signals. For example, the audio component 1210 includes a microphone (MIC), and when the device 1200 is in an operation mode, such as a call mode, a recording mode and a voice recognition mode, the microphone is configured to receive external audio signals. The received audio signals may be further stored in the memory 1204 or sent by the communication component 1216. In some examples, the audio component 1210 further includes a speaker for outputting audio signals.

The I/O interface 1212 provides an interface between the processing component 1202 and a peripheral interface module. The peripheral interface module may be a keyboard, a click wheel, a button, etc. The button may include but is not limited to a home button, a volume button, a start button and a lock button.

The sensor component 1214 includes one or more sensors for providing various aspects of status assessment for the apparatus 1200. For example, the sensor component 1214 may detect an on/off state of the apparatus 1200, and relative positions of components such as a display and a keypad of the apparatus 1200. The sensor component 1214 may also detect a position change of the apparatus 1200 or one component of the apparatus 1200, presence or absence of contact between the user and the apparatus 1200, an orientation or acceleration/deceleration of the apparatus 1200 and a temperature change of the apparatus 1200. The sensor component 1214 may include a proximity sensor configured to detect the presence of nearby objects without any physical contact. The sensor component 1214 may also include an optical sensor, such as a CMOS or CCD image sensor, for use in imaging applications. In some examples, the sensor component 1214 may also include an acceleration sensor, a gyroscope sensor, a magnetic sensor, a pressure sensor or a temperature sensor.

The communication component 1216 is configured to facilitate wired or wireless communication between the apparatus 1200 and other devices. The apparatus 1200 may access a wireless network based on communication standards, such as WiFi, 2G or 3G, or a combination thereof. In an example, the communication component 1216 receives broadcast signals or broadcast associated information from an external broadcast management system via a broadcast channel. In an example, the communication component 1216 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In an example, the apparatus 1200 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the above method.

In an example, a non-transitory computer-readable storage medium including instructions is further provided, such as a memory 1204 including instructions executable by the processor 1220 of the apparatus 1200 to carry out the above method. For example, the non-transitory computer-readable storage medium may be an ROM, a random access memory (RAM), a CD-ROM, a magnetic tape, a floppy disk, an optical data storage device, etc.

The apparatus examples substantially correspond to the method examples, so reference may be made to the descriptions of the method examples to describe the functionality of the apparatus. The apparatus examples described above are merely illustrative. The units described as separate components may or may not be physically separated, and the components displayed as units may or may not be physical units, that is, they may be located in one place, or may be distributed to a plurality of network units. Some or all of the modules may be selected according to actual needs to achieve the objectives of the solutions of the examples. Those of ordinary skill in the art can understand and implement without any creative effort.

It should be noted that the relational terms herein such as first and second are used only to differentiate an entity or operation from another entity or operation, and do not require or imply any actual relationship or sequence between these entities or operations. The terms "include", "comprise", or any variants are intended to cover a non-exclusive inclusion, so that a process, method, article, or device that includes a series of elements not only includes those elements, but also includes other elements not listed explicitly, or includes inherent elements of the process, method, article, or device. In the absence of more limitations, an element defined by "include a . . . " does not exclude other same elements existing in the process, method, article, or device including the element.

Those skilled in the art would readily conceive of other examples of the disclosure after considering the specification and the practical examples provided by the disclosure herein. The present application is intended to cover any variations, uses or adaptive changes of the disclosure. These variations, uses or adaptive changes follow the general principle of the disclosure and include common general knowledge or conventional technical means in the technical field that are not disclosed in the disclosure. The specification and the examples are merely regarded as exemplary, and the real scope and spirit of the disclosure are indicated by the following claims.

It should be understood that the disclosure is not limited to the precise structure described above and shown in the drawings, and various modifications and changes can be made without departing from its scope. The scope of the disclosure is only limited by the appended claims.

What is claimed is:

1. An information configuration method, applied to a base station, the method comprising:
sending an information reporting request to a terminal working on an unlicensed frequency band, the information reporting request being used to request the terminal to report listen before talk (LBT) information, wherein the number of LBT failures exceeds a preset number;
receiving the LBT information reported by the terminal according to the information reporting request; and
performing parameter configuration on the terminal according to the LBT information,
wherein before the sending an information reporting request to a terminal working on an unlicensed frequency band, the method further comprises:
receiving a notification sent by the terminal that the terminal has stored the LBT information,
wherein the LBT information comprises:
LBT results and location information of LBT; and
location information when the LBT fails; and
location information where the number of LBT failures is greater than a preset number, and
wherein the performing parameter configuration on the terminal according to the LBT information comprises:
determining, according to the LBT information, a target area with an LBT failure probability greater than a preset probability; and
increasing a random access response (RAR) waiting window duration of the target area.

2. An information reporting method, applied to a terminal working on an unlicensed frequency band, the method comprising:

receiving an information reporting request sent by a base station to a terminal working on an unlicensed frequency band, the information reporting request being used to request the terminal to report listen before talk (LBT) information, wherein the number of LBT failures exceeds a preset number;

reporting the LBT information to the base station according to the information reporting request, performing parameter configuration on the terminal according to the LBT information, wherein before the receiving an information reporting request sent by a base station, the method further comprises:

when connected to the base station, sending to the base station a notification that the terminal has stored the LBT information, wherein before the sending to the base station a notification that the terminal has stored the LBT information, the method further comprises:

recording and saving the LBT information when performing LBT, and wherein the LBT information comprises:

LBT results and location information of LBT;

location information when the LBT fails; and location information where a target area with the number of LBT failures is greater than a preset number; and increasing a random access response (RAR) waiting window duration of the target area.

3. A base station, comprising:

a processor; and a memory for storing processor executable instructions, where the processor is configured to:

send an information reporting request to a terminal working on an unlicensed frequency band, the information reporting request being used to request the terminal to report listen before talk (LBT) information, wherein the number of LBT failures exceeds a preset number;

receive the LBT information reported by the terminal according to the information reporting request; and perform parameter configuration on the terminal according to the LBT information, wherein the processor is further configured to:

receive a notification sent by the terminal that the terminal has stored the LBT information, before the sending an information reporting request to a terminal working on an unlicensed frequency band, wherein the LBT information comprises:

LBT results and location information of LBT;

location information when the LBT fails; and location information where the number of LBT failures is greater than a preset number, and wherein the parameter configuration performed by the processor is further configured to:

determine, according to the LBT information, a target area with an LBT failure probability greater than a preset probability; and increase a random access response (RAR) waiting window duration of the target area.

* * * * *